US012798649B2

(12) United States Patent
Iimura et al.

(10) Patent No.: US 12,798,649 B2
(45) Date of Patent: Nov. 17, 2026

(54) TROLLEY

(71) Applicant: Honda Motor Co., Ltd., Tokyo (JP)

(72) Inventors: Taiki Iimura, Saitama (JP); Kazumasa Ozaki, Saitama (JP); Hiroshi Iwakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 786 days.

(21) Appl. No.: 18/181,538

(22) Filed: Mar. 9, 2023

(65) Prior Publication Data

US 2023/0303145 A1 Sep. 28, 2023

(30) Foreign Application Priority Data

Mar. 28, 2022 (JP) ................................ 2022-051680

(51) Int. Cl.
*B62B 5/00* (2006.01)

(52) U.S. Cl.
CPC .......... *B62B 5/0073* (2013.01); *B62B 5/0043* (2013.01); *B62B 2301/25* (2013.01)

(58) Field of Classification Search
CPC .. B62B 5/0073; B62B 5/0043; B62B 2301/25
USPC .......................................................... 180/6.5
See application file for complete search history.

(56) References Cited

U.S. PATENT DOCUMENTS 5,746,282 A 5/1998 Fujiwara et al.
2006/0066268 A1 3/2006 Noro et al.
2010/0268420 A1* 10/2010 Yasui .................. B60T 8/17555 701/41
2014/0345956 A1 11/2014 Kojina
2019/0126977 A1* 5/2019 Kim .......................... B62D 6/02
2020/0010112 A1* 1/2020 Toko .................... B62D 5/0409
2023/0001914 A1* 1/2023 Kim ....................... B60W 30/12

FOREIGN PATENT DOCUMENTS

BR 112021005800 A2 * 6/2021 ......... A01D 41/1277
CN 1754527 4/2006
JP H08282498 10/1996

(Continued)

OTHER PUBLICATIONS

"Office Action of China Counterpart Application", issued on Aug. 29, 2025, with English translation thereof, p. 1-p. 14.

*Primary Examiner* — Jacob D Knutson
*Assistant Examiner* — Mohamed M Medani
(74) *Attorney, Agent, or Firm* — JCIPRNET

(57) ABSTRACT

A trolley includes: a vehicle body; omnidirectional wheels; drive units; a handle; a sensor; and a control device for controlling the drive units based on the longitudinal load, lateral load, and moment about the vertical axis applied to the handle detected by the sensor. The control device: sets a target longitudinal velocity of the vehicle body based on the longitudinal load, a target lateral velocity of the vehicle body based on the lateral load, and a target angular velocity about the vertical axis of the vehicle body based on the moment about the vertical axis; corrects the target lateral velocity based on the target angular velocity so that an absolute value of the target lateral velocity decreases as an absolute value of the target angular velocity increases; and controls the drive units based on the target longitudinal velocity, the corrected target lateral velocity, and the target angular velocity.

5 Claims, 8 Drawing Sheets

(56) References Cited

FOREIGN PATENT DOCUMENTS

| | | | | |
|---|---|---|---|---|
| JP | 2001071927 | | | 3/2001 |
| JP | 2001097221 | | | 4/2001 |
| JP | 2001097221 | A | * | 4/2001 |
| JP | 2001122124 | | | 5/2001 |
| JP | 2004114800 | | | 4/2004 |
| JP | 2017210035 | | | 11/2017 |

* cited by examiner

TROLLEY

CROSS-REFERENCE TO RELATED APPLICATION

This application claims the priority benefit of Japan application serial no. 2022-051680, filed on Mar. 28, 2022. The entirety of the above-mentioned patent application is hereby incorporated by reference herein and made a part of this specification.

BACKGROUND

Technical Field

The disclosure relates to a trolley.

Related Art

Patent Literature 1 discloses a power-assisted trolley having a handle for detecting an operation force of a user and a power-assist control part for driving drive wheels for traveling and steering based on the operation force input to the handle.

Patent Literature 2 discloses omnidirectional wheels for moving a vehicle body in all directions along a floor surface.

CITATION LIST

Patent Literature

[Patent Literature 1] Japanese Patent Application Laid-Open No. 2004-114800

[Patent Literature 2] Japanese Patent Application Laid-Open No. 2017-210035

When the omnidirectional wheels as in Patent Literature 2 are applied to the wheels of the trolley according to Patent Literature 1, the trolley may move in parallel in the left-right direction. In this case, it is conceivable that the control device of the trolley sets a target lateral velocity based on the lateral load applied to the handle, and drives the omnidirectional wheels in the left-right direction based on the target lateral velocity. It is also conceivable to set a target angular velocity about the vertical axis based on the moment applied to the handle about the vertical axis, and differentiate the longitudinal velocity of the left and right omnidirectional wheels based on the target angular velocity. However, when the user operates the handle to turn the trolley, it is difficult to apply only a moment about the vertical axis to the handle without applying a load in the left-right direction. Therefore, when the user performs a turning operation, an unintended lateral load is applied to the handle, and there is a risk that the trolley may move in a left-right direction unintended by the user.

In view of the above, the disclosure provides a trolley capable of performing an appropriate turning operation.

SUMMARY

In view of the above, an embodiment of the disclosure provides a trolley (1) including: a vehicle body (2); left and right omnidirectional wheels (3) provided on the vehicle body for moving the vehicle body in all directions along a floor surface; left and right drive units (4) for driving each of the omnidirectional wheels; a handle (5) provided on the vehicle body for receiving an operation of a user; a sensor (6) for detecting a longitudinal load, a lateral load, and a moment about a vertical axis applied to the handle; and a control device (7) for controlling the drive units based on the longitudinal load, the lateral load, and the moment about the vertical axis detected by the sensor. The control device: sets a target longitudinal velocity of the vehicle body based on the longitudinal load, a target lateral velocity of the vehicle body based on the lateral load, and a target angular velocity about the vertical axis of the vehicle body based on the moment about the vertical axis; corrects the target lateral velocity based on the target angular velocity so that an absolute value of the target lateral velocity decreases as an absolute value of the target angular velocity increases; and controls the drive units based on the target longitudinal velocity, the corrected target lateral velocity, and the target angular velocity.

DESCRIPTION OF THE EMBODIMENTS

Figure 1:
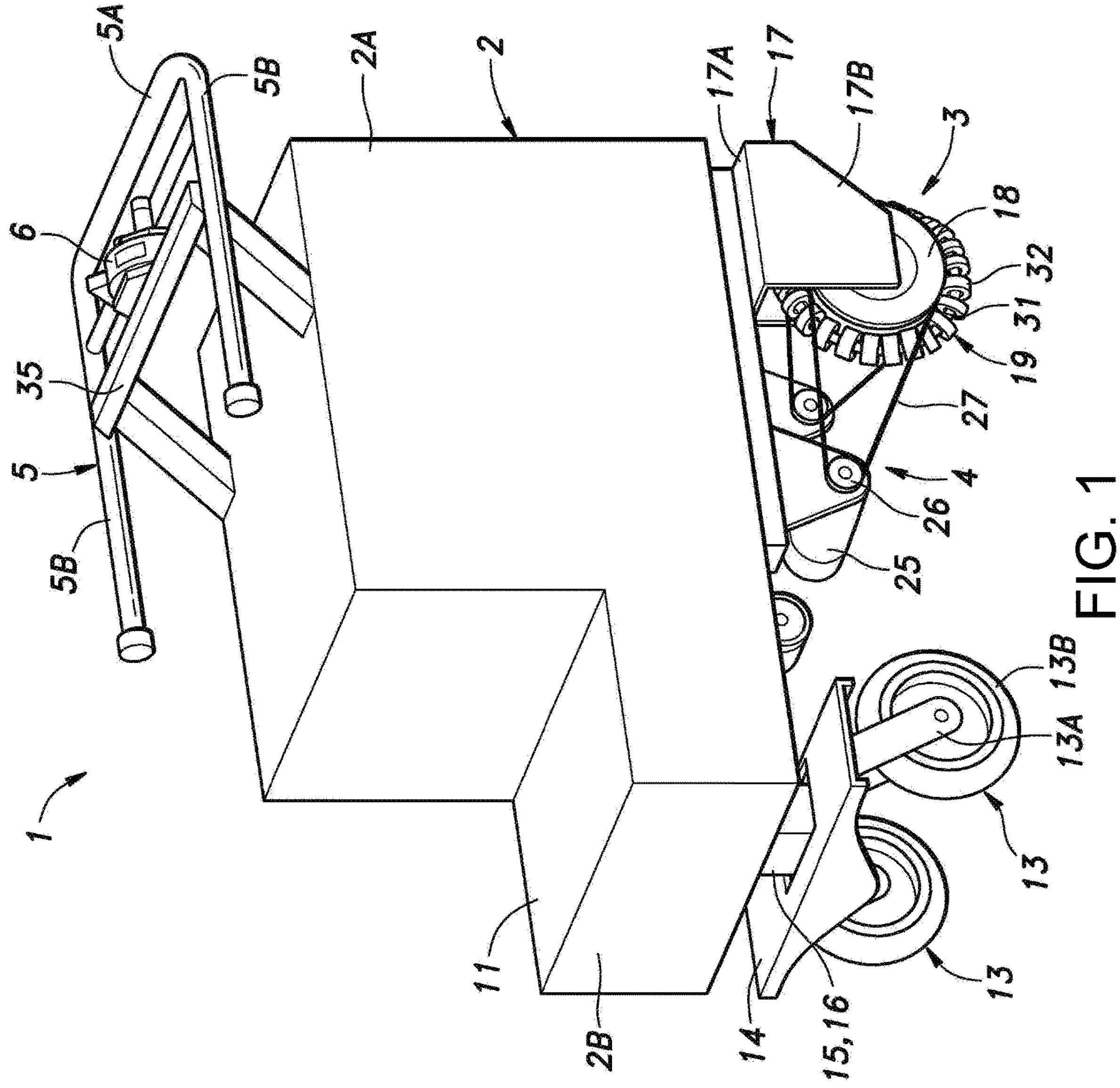
FIG. 1 is a perspective view of a trolley according to an embodiment.

According to this embodiment, it is possible to provide a trolley capable of performing an appropriate turning operation. Since the target lateral velocity is corrected to decrease as the target angular velocity increases, even if the user applies an unintended lateral load to the handle during a turning operation, the trolley is prevented from moving in the left-right direction.

In the above embodiment, the control device may set a lateral velocity upper limit based on the target angular velocity, with the lateral velocity upper limit being set so that an absolute value of the lateral velocity upper limit decreases as the absolute value of the target angular velocity increases, and may correct the target lateral velocity so that the absolute value of the target lateral velocity is less than or equal to the lateral velocity upper limit.

According to this embodiment, by decreasing the lateral velocity upper limit in accordance with an increase in the target angular velocity, movement in the left-right direction during turning may be suppressed.

In the above embodiment, the lateral velocity upper limit may be set to a value greater than or equal to a predetermined lower limit.

According to this embodiment, the trolley slightly moves in the left-right direction according to the user's turning operation. In this way, it is possible to bring the operational feeling of the user closer to the response of the trolley.

In the above embodiment, the lateral velocity upper limit may have a negative linear relationship with the target angular velocity in a region greater than or equal to the lower limit.

According to this embodiment, the lateral velocity upper limit may be made to decrease in accordance with an increase in the target angular velocity.

In the above embodiment, the control device may correct the target angular velocity so that the absolute value of the target angular velocity becomes less than or equal to a predetermined angular velocity upper limit, and may control the drive units based on the corrected target angular velocity instead of the target angular velocity.

According to this embodiment, the upper limit of the angular velocity about the vertical axis of the trolley is set, and the operation of the trolley becomes easy.

In the above embodiment, the control device may correct the target lateral velocity based on a correction value of the target angular velocity so that the absolute value of the target lateral velocity decreases as an absolute value of the correction value of the target angular velocity increases.

According to this embodiment, since the target lateral velocity is corrected based on the corrected target angular velocity, it is possible to prevent the target lateral velocity from dropping too much. In this way, the trolley may generate a drive force more adapted to the user's operational feeling.

In the above embodiment, the control device may correct the target longitudinal velocity so that an absolute value of the target longitudinal velocity is less than or equal to a predetermined longitudinal velocity upper limit, and may control the drive units based on the corrected target longitudinal velocity instead of the target longitudinal velocity.

According to this embodiment, the upper limit of the longitudinal velocity of the trolley is set, and the operation of the trolley becomes easy.

According to the above configurations, it is possible to provide a trolley capable of performing an appropriate turning operation.

An embodiment of a trolley according to the disclosure will be described below with reference to the drawings. In the following description, each direction is determined with the trolley as a reference.

As shown in FIG. 1, the trolley 1 includes a vehicle body 2, at least one omnidirectional wheel 3 provided on the vehicle body 2 for moving the vehicle body 2 in all directions along the floor surface, a drive unit 4 for driving each omnidirectional wheel 3, a handle 5 provided on the vehicle body 2 and receiving the user's operation, a force sensor 6 for detecting the load applied to the handle 5, and a control device 7 for controlling the drive unit 4 based on each load detected by the force sensor.

The vehicle body 2 extends in the front-rear direction. A rear part 2A of the vehicle body 2 extends above a front part 2B. The front part 2B of the vehicle body 2 is provided with a support base 11 for supporting other devices. The devices supported by the support base 11 include, for example, inspection equipment such as X-ray scanners. The devices may be fastened to the support base 11. The control device 7, a battery, and various sensors may be provided inside the rear part 2A of the vehicle body 2.

In this embodiment, a pair of omnidirectional wheels 3 are provided at the lower part of the rear part 2A of the vehicle body 2. Left and right casters 13 are supported at the lower part of the front part 2B of the vehicle body 2 via suspensions. The suspension is disposed below the vehicle body 2 and includes an arm 14 extending left and right, and a spring 15 and a shock absorber 16 disposed between the vehicle body 2 and the arm 14. Each caster 13 is disposed below the left end and right end of the arm 14. Each caster 13 includes a fork 13A rotatably coupled to the arm 14 about an axis extending vertically, and a wheel 13B rotatably supported by the fork 13A about an axis extending horizontally. The fork 13A rotates freely with respect to the arm 14, and the wheel 13B rotates freely with respect to the fork 13A.

Figure 2:
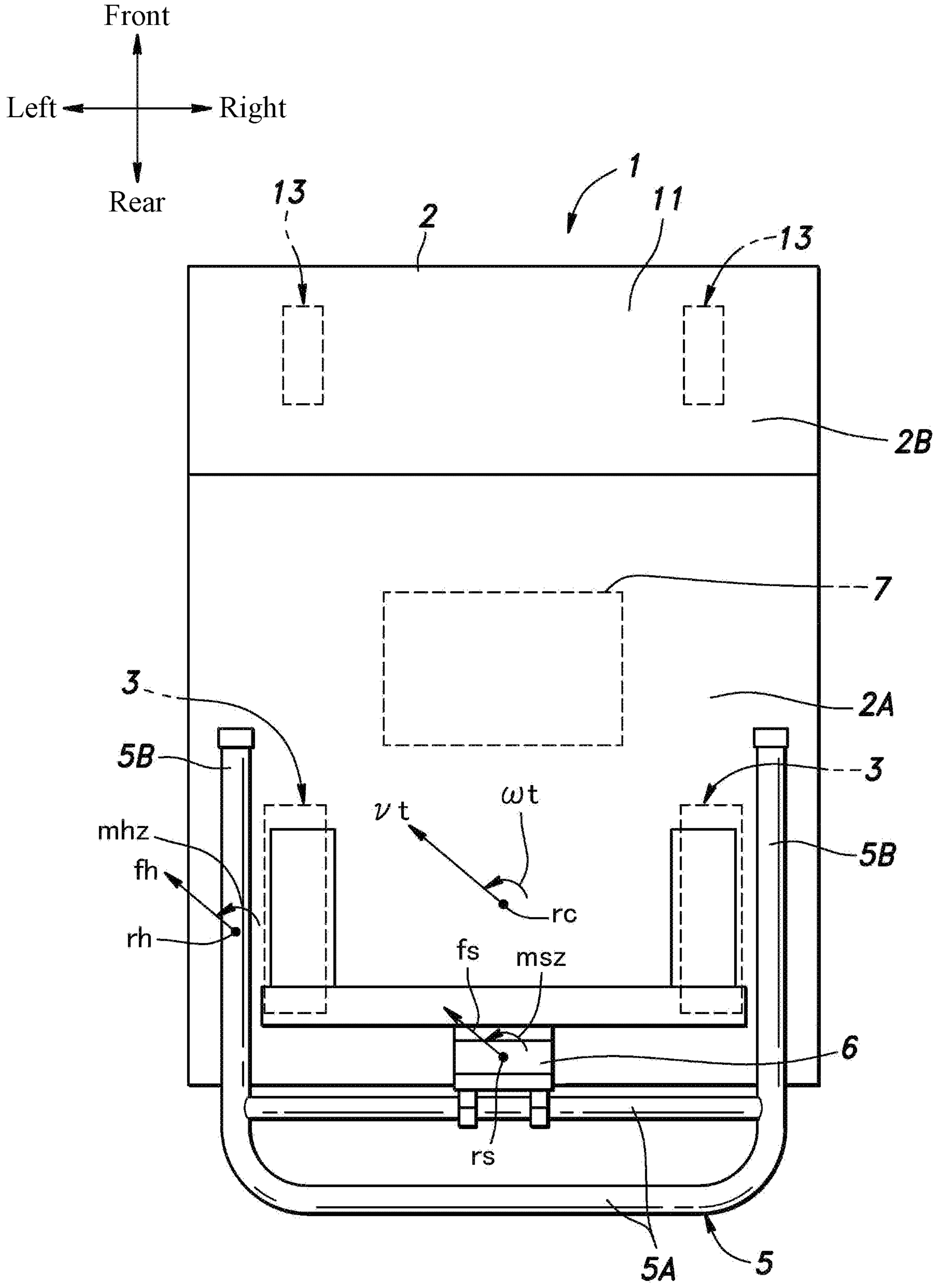
FIG. 2 is a plan view of the trolley.
Figure 3:
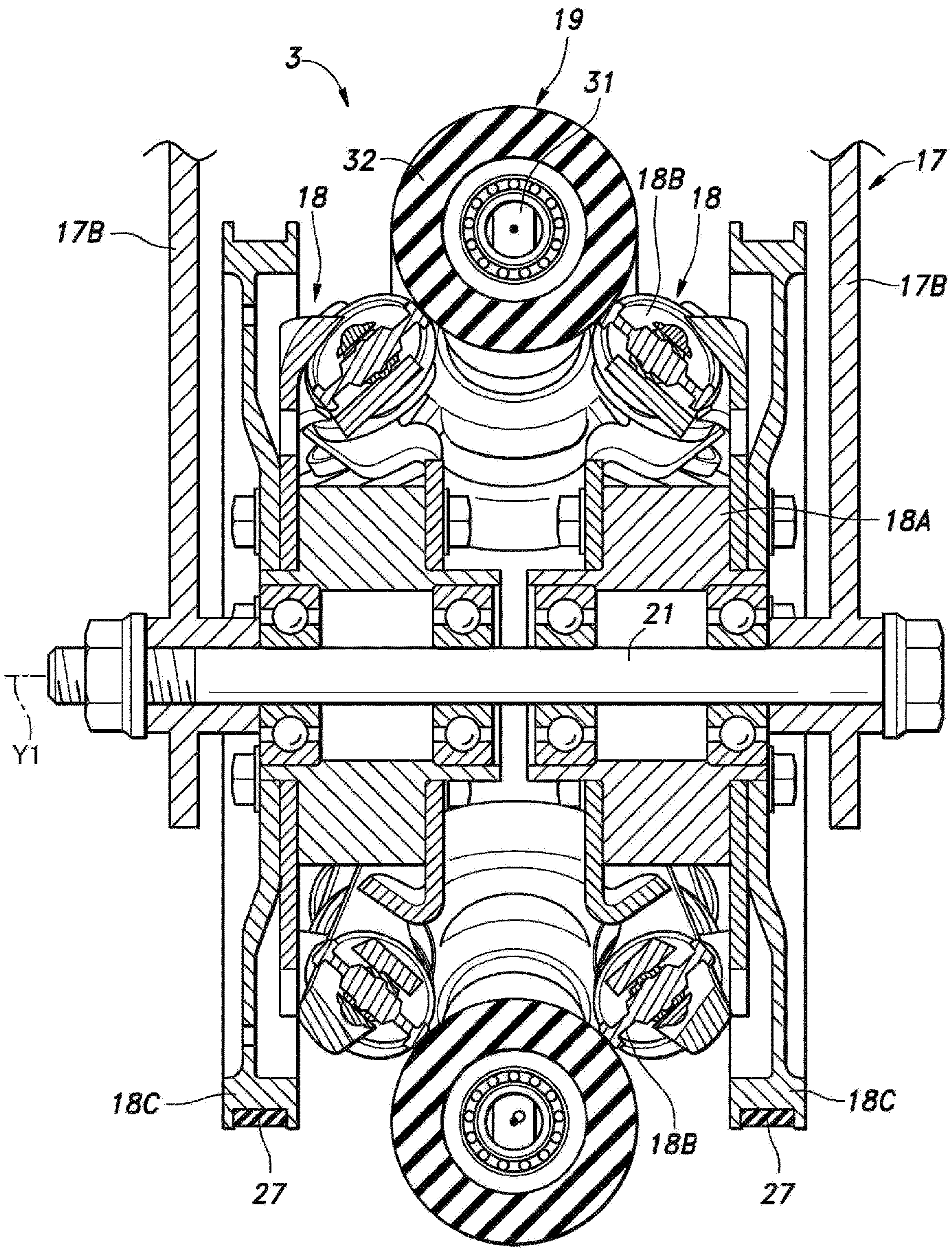
FIG. 3 is a cross-sectional view of an omnidirectional wheel.

As shown in FIG. 2, the pair of omnidirectional wheels 3 are disposed with a space left and right. In this embodiment, the pair of omnidirectional wheels 3 are disposed on the lower left and lower right of the rear part 2A of the vehicle body 2. As shown in FIG. 3, each omnidirectional wheel 3 includes a frame 17, a pair of drive discs 18 rotatably supported by the frame 17, and an annular main wheel 19 disposed between the pair of drive discs 18.

As shown in FIGS. 1 and 3, the frame 17 includes a frame upper part 17A coupled to the lower part of the vehicle body 2, and a pair of frame side parts 17B extending downward from both left and right ends of the frame upper part 17A. A support shaft 21 extending left and right spans the lower ends of the pair of frame side parts 17B. The pair of drive disks 18 are rotatably supported on the support shaft 21. The pair of drive disks 18 rotate about the axis Y1 of the support shaft 21. The position of each drive disk 18 in the left-right direction with respect to the support shaft 21 is restricted. Each drive disk 18 faces each other with a distance in the left-right direction.

The drive discs 18 are disposed on both sides of the annular main wheel 19 and apply frictional force to the main wheel 19 to rotate the main wheel 19 about the central axis and the annular axis. The drive disc 18 includes a disc-shaped base 18A rotatably supported by the frame 17, and multiple drive rollers 18B rotatably supported on the outer periphery of the base 18A while being inclined with respect to each other, and in contact with the main wheel 19. The base 18A is disposed coaxially with the support shaft 21.

Driven pulleys 18C are provided on opposite surfaces of each drive disk 18, respectively. The driven pulley 18C is provided coaxially with the drive disc 18. The drive unit 4 is provided under the vehicle body 2 and includes multiple electric motors 25 corresponding to the respective drive discs 18. In this embodiment, four electric motors 25 are provided corresponding to the four drive discs 18. A drive pulley 26 is provided on the output shaft of each electric motor 25. A belt 27 connects the corresponding drive pulley 26 and driven pulley 18C. By rotating each electric motor 25 independently of each other, each drive disk 18 rotates independently of each other.

Figure 4:
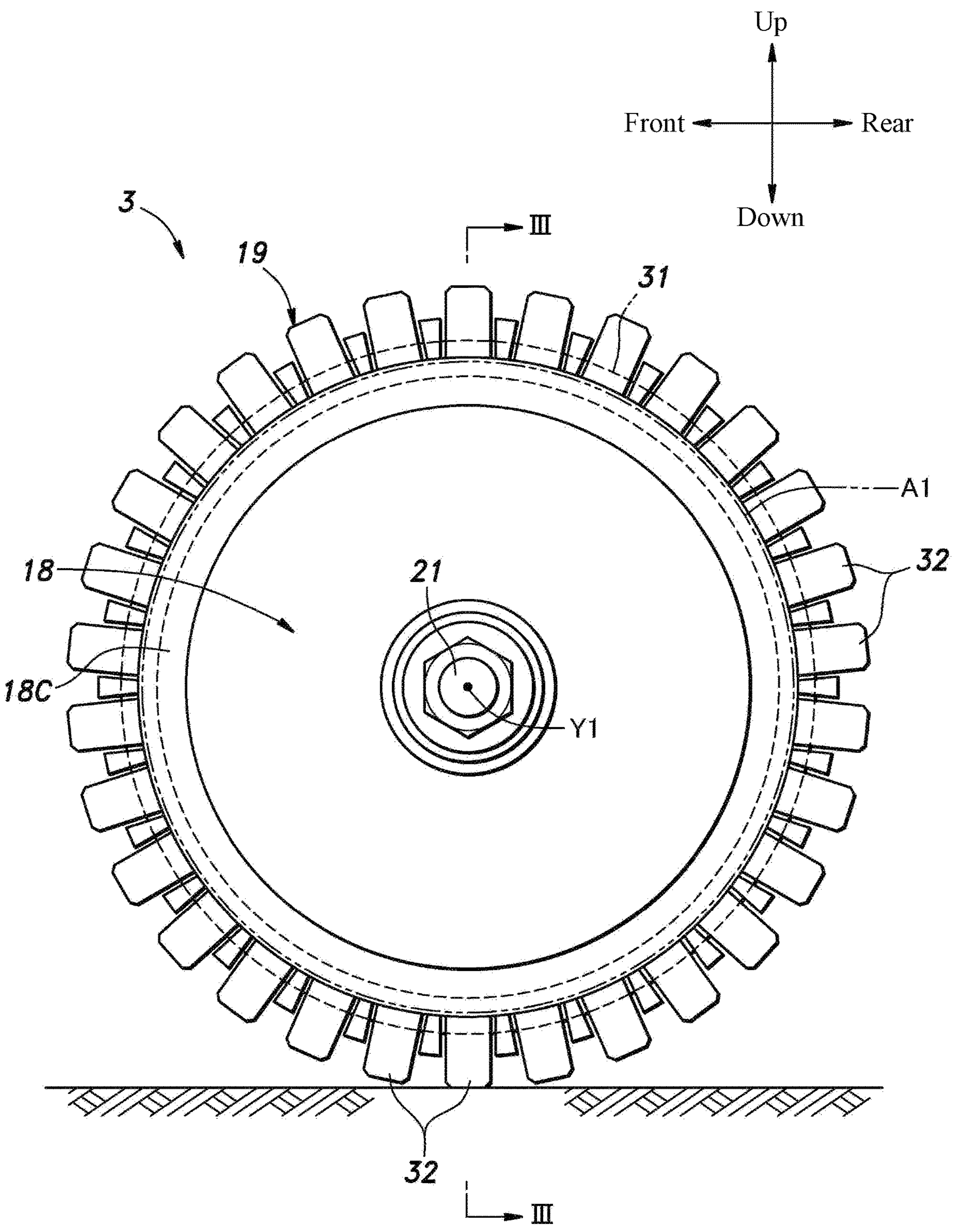
FIG. 4 is a side view of a main wheel.

As shown in FIG. 4, the main wheel 19 has an annular shape, is disposed coaxially with the drive disks 18 between the pair of drive disks 18, contacts multiple drive rollers 18B, and is rotatable around the central axis and the annular axis. The main wheel 19 includes an annular core 31 and multiple driven rollers 32 rotatably supported by the core 31. The multiple driven rollers 32 are disposed at regular intervals in the circumferential direction of the core 31. Each driven roller 32 is supported by the core 31 so as to be rotatable around the axis Al (annular axis) of the annular core 31. Each driven roller 32 may rotate about a tangent to the core 31 at its respective position relative to the core 31. Each driven roller 32 rotates with respect to the core 31 upon receiving an external force.

The main wheel 19 is disposed along the outer periphery of the pair of drive discs 18 and is in contact with multiple drive rollers 18B provided on each drive disc 18. The drive rollers 18B of each drive disk 18 contact the inner periphery of the main wheel 19 and sandwich the main wheel 19 from both left and right sides. Further, the drive rollers 18B of the left and right drive discs 18 restrict the radial displacement of the drive discs 18 about the axis Y1 by contacting the inner periphery of the main wheel 19. In this way, the main wheel 19 is supported by the left and right drive discs 18, and the central axis of the main wheel 19 (core 31) is disposed coaxially with the axis Y1 of the left and right drive discs 18. The main wheel 19 contacts the multiple drive rollers 18B of the left and right drive discs 18 at the multiple driven rollers 32.

In each omnidirectional wheel 3, when the pair of drive discs 18 rotate in the same direction at the same rotation speed, the main wheel 19 rotates together with the pair of drive discs 18. That is, the main wheel 19 rolls forward or backward around its own rotation axis that coincides with the axis Y1. At this time, the drive rollers 18B of the drive disc 18 and the driven rollers 32 of the main wheel 19 do not rotate with respect to the core 31. In each omnidirectional wheel 3, when a rotation speed difference occurs between the pair of drive discs 18, a force component perpendicular to the force in the circumferential (tangential) direction caused by the rotation of the pair of drive discs 18 acts on the driven rollers 32 of the main wheel 19 from the left and right drive rollers 18B. Since the axis of the drive roller 18B is inclined with respect to the circumferential direction of the drive roller 18B, a force component is generated between the drive discs 18 due to the rotation speed difference. This force component causes the drive rollers 18B to rotate relative to the base 18A and the driven rollers 32 to rotate relative to the core 31. In this way, the main wheel 19 generates a drive force in the left-right direction.

The left and right omnidirectional wheels 3 rotate forward at the same speed to move the trolley 1 forward. The left and right omnidirectional wheels 3 rotate backward at the same speed to move the trolley 1 backward. When a speed difference occurs in the rotation of the left and right omnidirectional wheels 3 in the front-rear direction, the trolley 1 turns rightward or leftward. By rotating the driven rollers 32 of the respective main wheels 19 of the left and right omnidirectional wheels 3, the trolley 1 is translated rightward or leftward.

As shown in FIGS. 1 and 2, a handle holder 35 protruding upward is provided on the upper part of the rear part 2A of the vehicle body 2. The handle 5 is supported by the handle holder 35 via the force sensor 6. The force sensor 6 may be a three-axis force sensor that detects loads along two axes perpendicular to each other on the horizontal plane and moments about the vertical axis (z-axis). In this embodiment, the force sensor 6 detects a longitudinal load that is the load applied to the handle 5 in the longitudinal direction (x-axis), a lateral load that is the load in the lateral direction (y-axis), and the moment around the vertical axis (z-axis). The force sensor 6 includes a main body and an input part provided on the main body. The main body is coupled to the handle holder 35.

The handle 5 includes a horizontal part 5A extending left and right, and a pair of vertical parts 5B extending forward from both left and right ends of the horizontal part 5A. A central part of the horizontal part 5A in the left-right direction is coupled to the input part of the force sensor 6.

As shown in FIG. 2, when the user applies an external force fh and a moment mhz to a position rh of the handle 5, the force sensor 6 detects a detected force fs and a detected moment msz at a sensor position rs. The detected force fs includes a longitudinal load fs1, which is a longitudinal component, and a lateral load fs2, which is a lateral component.

The control device 7 is an electronic control unit (ECU) including a processor such as a CPU, a nonvolatile memory (ROM), a volatile memory (RAM), and the like. The control device 7 controls the drive unit 4 by executing arithmetic processing in accordance with a program stored in the non-volatile memory in the processor. The control device 7 may be configured as one piece of hardware, or may be configured as a unit configured by multiple pieces of hardware. Moreover, at least a part of each functional part of the control device 7 may be implemented by hardware such as LSI, ASIC, or FPGA, or may be implemented by a combination of software and hardware.

Figure 5:
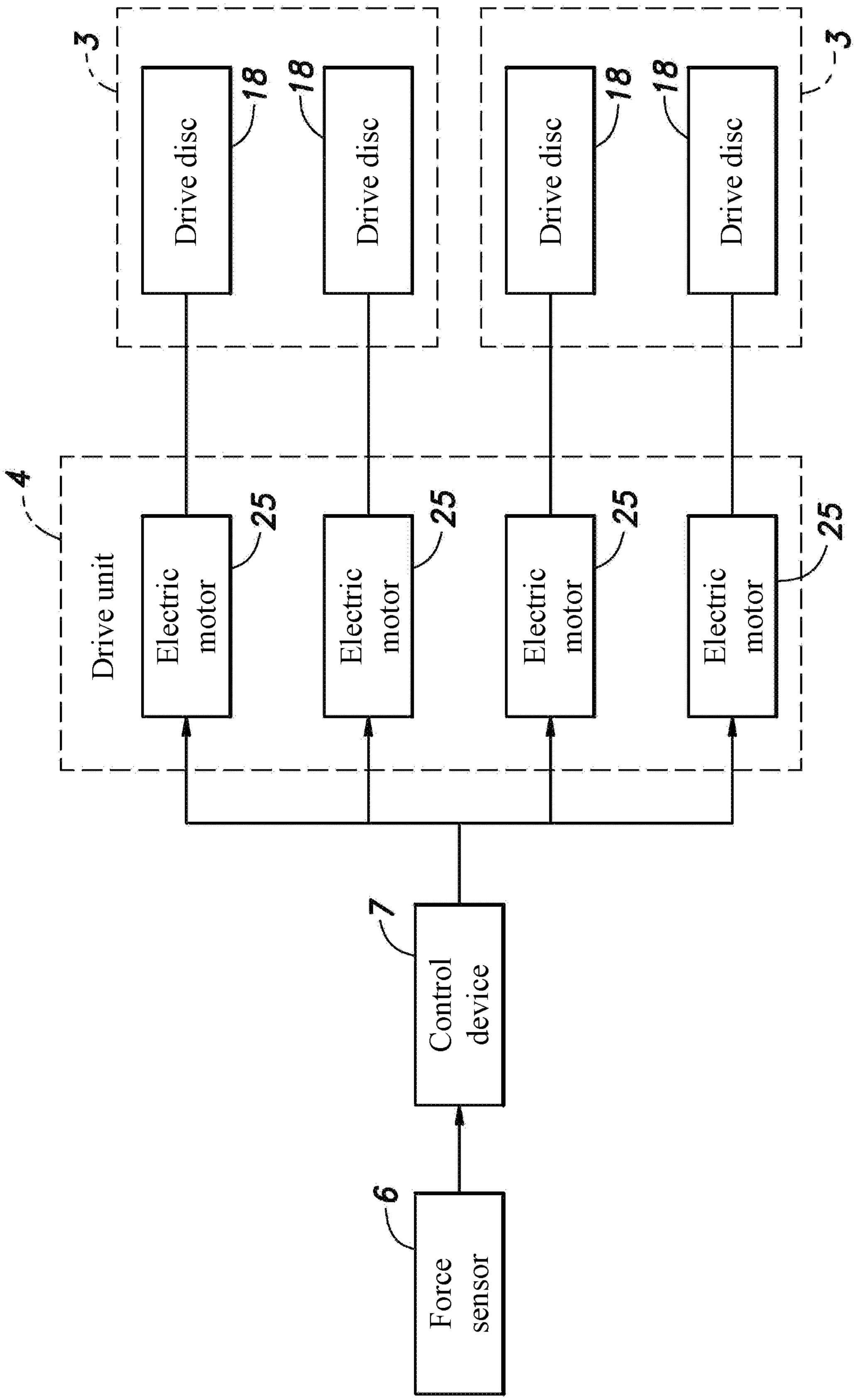
FIG. 5 is a block diagram showing a control device of the trolley.

As shown in FIG. 5, the control device 7 is connected with the force sensor 6 and the drive unit 4. The force sensor 6 outputs a detection signal to the control device 7. The control device 7 outputs a control signal to the drive unit 4.

The control device 7 controls the drive unit 4 based on the signal from the force sensor 6. The force sensor 6 is interposed between the vehicle body 2 and the handle 5. The force sensor 6 detects the magnitude and direction of the operating force (load) applied to the handle 5 by the user. The control device 7 may determine a target longitudinal velocity vt1, a target lateral velocity vt2, and a target angular velocity ωt of the trolley 1 based on signals from the force sensor 6, and may determine the control amount of each electric motor 25 of the drive unit 4 based on the target longitudinal velocity vt1, the target lateral velocity vt2, and the target angular velocity ωt.

Figure 6:
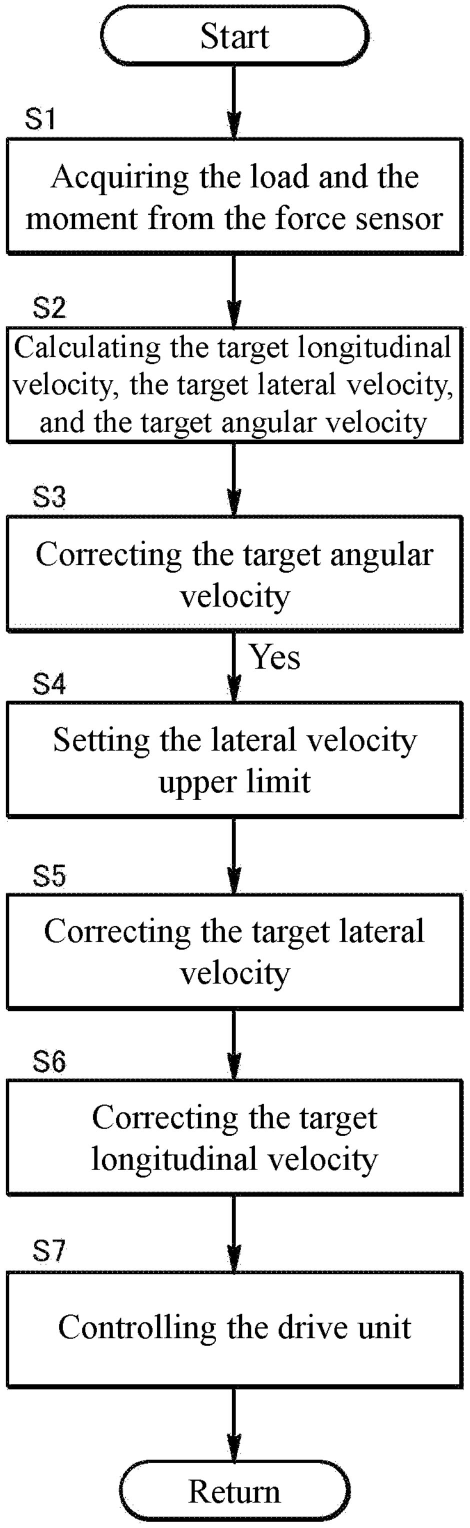
FIG. 6 is a flowchart showing a control procedure executed by the control device.

The control device 7 controls the drive unit 4 based on the flowchart shown in FIG. 6. First, the control device 7 acquires the detected force fs and the detected moment msz detected by the force sensor 6 based on the signals from the force sensor 6 (S1). The detected force fs includes the longitudinal load fs1 and the lateral load fs2.

Next, the control device 7 sets the target longitudinal velocity vt1 of the vehicle body 2 based on the longitudinal load fs1, sets the target lateral velocity vt2 of the vehicle body 2 based on the lateral load fs2, and sets the target angular velocity ωt about the vertical axis of the vehicle body 2 based on the moment msz about the vertical axis (S2).

The target longitudinal velocity vt may be set, for example, by multiplying the longitudinal load fs1 by a predetermined coefficient k1. Further, the target lateral velocity vt2 may be set by, for example, multiplying the lateral load fs2 by a predetermined coefficient k2. Further, the target angular velocity ωt may be set by, for example, multiplying the moment msz about the vertical axis by a predetermined coefficient k3. The target angular velocity ωt is set around a reference point. The reference point may be set at a position that coincides with the center of gravity of the trolley 1 in plan view. In this embodiment, the reference point is disposed at the midpoint of the line connecting the pair of omnidirectional wheels 3. In addition, the method of setting the target longitudinal velocity vt1, the target lateral velocity vt2, and the target angular velocity ωt is not limited to the above.

Next, the control device 7 corrects the target angular velocity ωt so that the absolute value of the target angular velocity ωt becomes less than or equal to a predetermined angular velocity upper limit (S3). The angular velocity upper limit may be a preset value. For example, when the absolute value of the target angular velocity ωt is greater than the angular velocity upper limit, the control device 7 may set the value of the target angular velocity ωt so that the absolute value of the target angular velocity ωt is equal to the angular velocity upper limit. Further, for example, when the absolute value of the target angular velocity ωt is smaller than the angular velocity upper limit, the control device 7 may set the target angular velocity ωt as it is as the corrected target angular velocity ωt.

Figure 7:
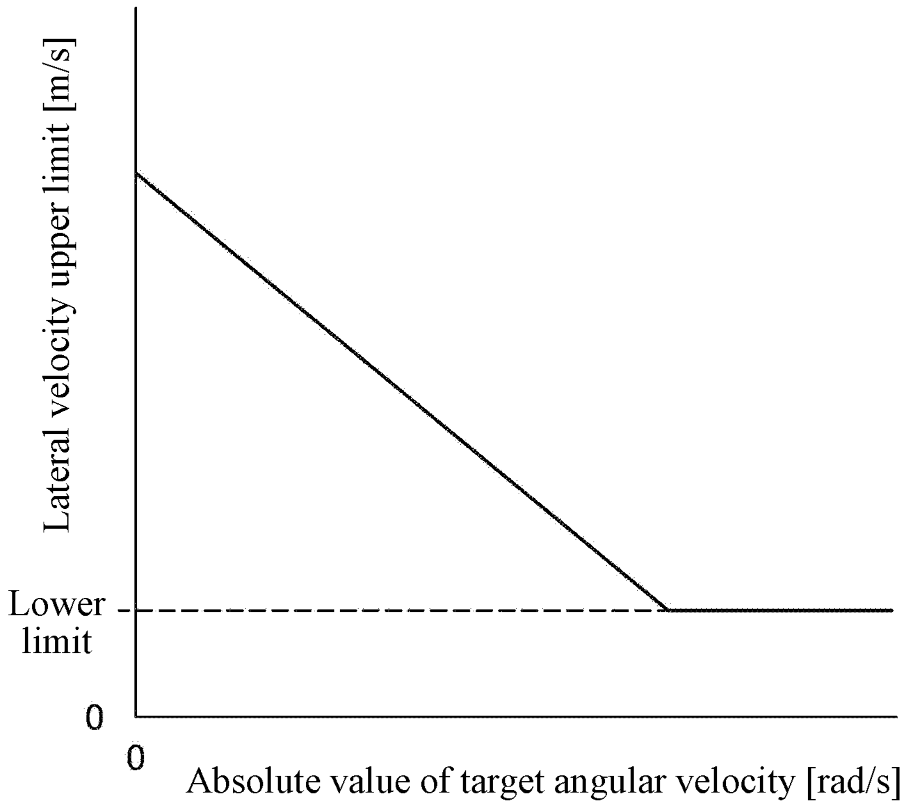
FIG. 7 is a map showing the relationship between the target angular velocity and the lateral velocity upper limit.

Next, the control device 7 sets the lateral velocity upper limit vt2u based on the corrected target angular velocity ωt (S4). The control device 7 may use, for example, the map shown in FIG. 7 to set the lateral velocity upper limit vt2u based on the target angular velocity ωt. The lateral velocity upper limit vt2u is set so that the absolute value of the lateral velocity upper limit vt2u decreases as the absolute value of the target angular velocity ωt increases. The lateral velocity upper limit vt2u is set to a value greater than or equal to a predetermined lower limit vt2u. The lower limit vt2u1 is set to a value greater than zero. The lateral velocity upper limit vt2u may have a negative linear relationship with the target angular velocity ωt in a region greater than or equal to the lower limit vt2u1.

Next, the control device 7 corrects the target lateral velocity vt2 based on the target lateral velocity vt2 and the lateral velocity upper limit vt2u so that the absolute value of the target lateral velocity vt2 becomes less than or equal to the lateral velocity upper limit vt2u (S5). For example, when the absolute value of the target lateral velocity vt2 is greater than the lateral velocity upper limit vt2u, the control device 7 may correct the value of the target lateral velocity vt2 so that the absolute value of the target lateral velocity vt2 becomes equal to the lateral velocity upper limit vt2u. Further, for example, when the absolute value of the target lateral velocity vt2 is less than the lateral velocity upper limit vt2u,the control device 7 may set the target lateral velocity vt2 as it is as the corrected target lateral velocity vt2.

Next, the control device 7 corrects the target longitudinal velocity vt1 so that the absolute value of the target longitudinal velocity vt1 becomes less than or equal to a predetermined longitudinal velocity upper limit (S6). The longitudinal velocity upper limit may be a preset value.

For example, when the absolute value of the target longitudinal velocity vt1 is greater than the longitudinal velocity upper limit, the control device 7 may set the value of the target longitudinal velocity vt1 so that the absolute value of the target longitudinal velocity vt1 becomes equal to the longitudinal velocity upper limit. Further, for example, when the absolute value of the target longitudinal velocity vt1 is less than the longitudinal velocity upper limit, the control device 7 may set the target longitudinal velocity vt1 as it is as the corrected target longitudinal velocity vt1.

The control device 7 controls the drive unit 4 based on the corrected target longitudinal velocity vt1, the corrected target lateral velocity vt2, and the corrected target angular velocity ωt (S7). The control device 7 sets the respective target rotation speeds rt of the electric motors 25 based on the corrected target longitudinal velocity vt1, the corrected target lateral velocity vt2, and the corrected target angular velocity ωt. Then, the control device 7 may control the current supplied to each electric motor 25 so that the rotation speed of each electric motor 25 becomes the target rotation speed.

An example of how the control device 7 controls the drive unit 4 is shown below. First, the control device 7 sets the first rotation speed r1 of each electric motor 25 based on the corrected target longitudinal velocity vt1 by referring to a first map. The relationship between the corrected target longitudinal velocity vt1 and the rotation speed of each electric motor 25 is defined in the first map. Next, the control device 7 sets the second rotation speed r2 of each electric motor 25 based on the corrected target lateral velocity vt2 by referring to a second map. The relationship between the corrected target lateral velocity vt2 and the rotation speed of each electric motor 25 is defined in the second map. Next, the control device 7 sets the third rotation speed r3 of each electric motor 25 based on the corrected target angular velocity cot by referring to a third map. The relationship between the corrected target angular velocity vt1 and the rotation speed of each electric motor 25 is defined in the third map. Next, the control device 7 calculates the target rotation speed rt of each electric motor 25 by adding the first rotation speed r1, second rotation speed r2, and third rotation speed r3 of each electric motor 25 (rt=r1+r2+r3). Then, the control device 7 sets the current value It to be supplied to each electric motor 25 based on the target rotation speed rt of each electric motor 25 by referring to a fourth map. The fourth map defines the relationship between the target rotation speed rt and the current value It supplied to each electric motor 25.

Figure 8:
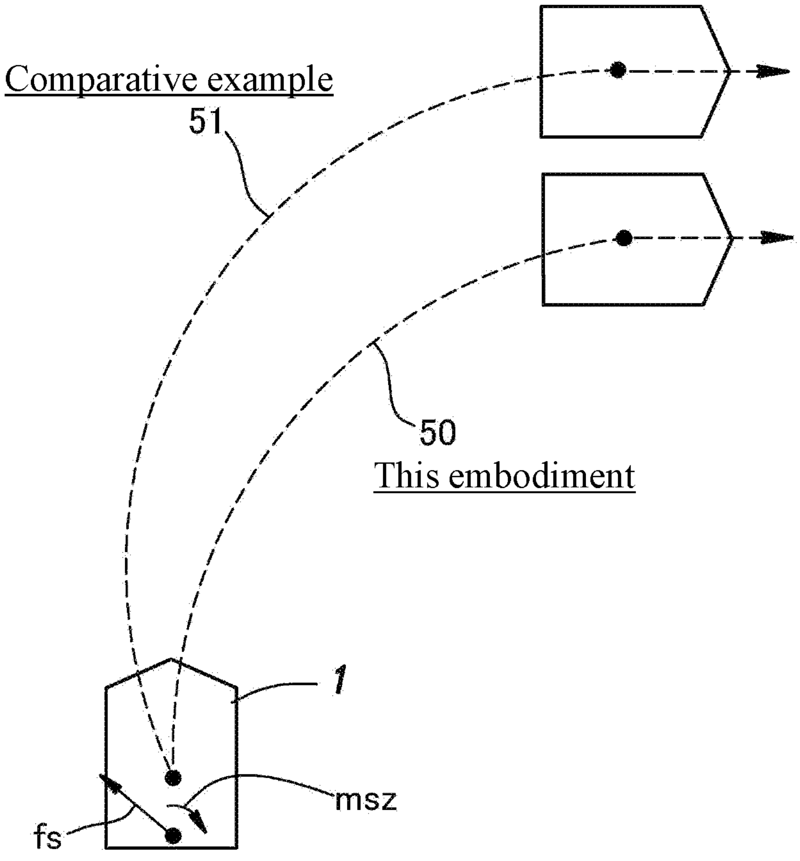
FIG. 8 is an illustration diagram showing the traveling locus of the trolley during turning.

According to the above embodiment, since the target lateral velocity vt2 is corrected to decrease as the target angular velocity cot increases, even if the user applies an unintended lateral load to the handle 5 during a turning operation, the trolley 1 is prevented from moving in the left-right direction. When the user wants to turn the trolley 1 to the right while the user is pushing the trolley 1 forward from the rear, the user applies a leftward load to the handle 5 provided at the rear part 2A of the trolley 1. In the trolley 1 according to this embodiment, since the target lateral velocity vt2 is corrected to decrease as the target angular velocity cot increases, the leftward target lateral velocity vt2 is suppressed with respect to the leftward load applied by the user. In this way, the trolley 1 may appropriately turn to the right, as indicated by a trajectory 50 in FIG. 8. In addition, in the comparative example in which the target lateral velocity vt2 is not corrected to decrease as the target angular velocity cot increases, a relatively large leftward target lateral velocity vt2 is set with respect to the leftward load applied by the user. In this way, as indicated by a trajectory 51 in FIG. 8, the trolley 1 turns rightward while swelling leftward. Thus, according to this embodiment, it is possible to provide the trolley 1 that may suppress the sliding movement in the left-right direction during turning.

The lateral velocity upper limit vt2u is set to a value greater than or equal to a predetermined lower limit vt2u1. In this way, the trolley 1 slightly moves in the left-right direction according to the user's turning operation. In this way, it is possible to bring the operational feeling of the user closer to the response of the trolley 1.

Since the target lateral velocity vt2 is corrected based on the corrected target angular velocity ωt, it is possible to prevent the target lateral velocity vt2 from dropping too much. In this way, the trolley 1 may generate a drive force more adapted to the user's operational feeling.

Although the specific embodiments have been described above, the disclosure is not limited to the above embodiments and may be widely modified. For example, various methods may be used for the control device 7 to correct the target lateral velocity vt2 so as to decrease as the target angular velocity cot increases. For example, the target lateral velocity vt2 may be corrected by setting a coefficient based on the target angular velocity cot and multiplying the target lateral velocity vt2 by the coefficient. The coefficient may decrease between 1 and 0, for example, as the target angular velocity cot increases.

In another embodiment, instead of the force sensor 6, a sensor capable of detecting the longitudinal load, the lateral load, and the moment about the vertical axis applied to the handle 5 may be used. For example, the sensor may be configured by combining multiple independent load sensors.

What is claimed is:

1. A trolley comprising:

a vehicle body;

left and right omnidirectional wheels provided on the vehicle body for moving the vehicle body in all directions along a floor surface;

left and right drive units for driving each of the omnidirectional wheels;

a handle provided on the vehicle body for receiving an operation of a user;

a sensor for detecting a longitudinal load, a lateral load, and a moment about a vertical axis applied to the handle; and a control device for controlling the drive units based on the longitudinal load, the lateral load, and the moment about the vertical axis detected by the sensor, wherein the control device:

sets a target longitudinal velocity of the vehicle body based on the longitudinal load, a target lateral velocity of the vehicle body based on the lateral load, and a target angular velocity about the vertical axis of the vehicle body based on the moment about the vertical axis, corrects the target lateral velocity based on the target angular velocity so that an absolute value of the target lateral velocity decreases as an absolute value of the target angular velocity increases, and controls the drive units based on the target longitudinal velocity, the corrected target lateral velocity, and the target angular velocity, wherein the control device sets a lateral velocity upper limit based on the target angular velocity, wherein the lateral velocity upper limit is set so that an absolute value of the lateral velocity upper limit decreases as the absolute value of the target angular velocity increases, and corrects the target lateral velocity so that the absolute value of the target lateral velocity is less than or equal to the lateral velocity upper limit, wherein the lateral velocity upper limit is set to a value greater than or equal to a predetermined lower limit, wherein the lateral velocity upper limit has a negative linear relationship with the target angular velocity in a region greater than or equal to the lower limit.

2. The trolley according to claim 1, wherein the control device corrects the target angular velocity so that the absolute value of the target angular velocity becomes less than or equal to a predetermined angular velocity upper limit, and controls the drive units based on the corrected target angular velocity instead of the target angular velocity.

3. The trolley according to claim 2, wherein the control device corrects the target lateral velocity based on a correction value of the target angular velocity so that the absolute value of the target lateral velocity decreases as an absolute value of the correction value of the target angular velocity increases.

4. The trolley according to claim 2, wherein the control device corrects the target longitudinal velocity so that an absolute value of the target longitudinal velocity is less than or equal to a predetermined longitudinal velocity upper limit, and controls the drive units based on the corrected target longitudinal velocity instead of the target longitudinal velocity.

5. The trolley according to claim 1, wherein the control device corrects the target longitudinal velocity so that an absolute value of the target longitudinal velocity is less than or equal to a predetermined longitudinal velocity upper limit, and controls the drive units based on the corrected target longitudinal velocity instead of the target longitudinal velocity.

* * * * *